Feb. 15, 1944.　　　　C. G. MAIER　　　　2,341,844
PROCESS FOR TREATING AND REDUCING CHROMIUM CHLORIDE
Original Filed April 27, 1940
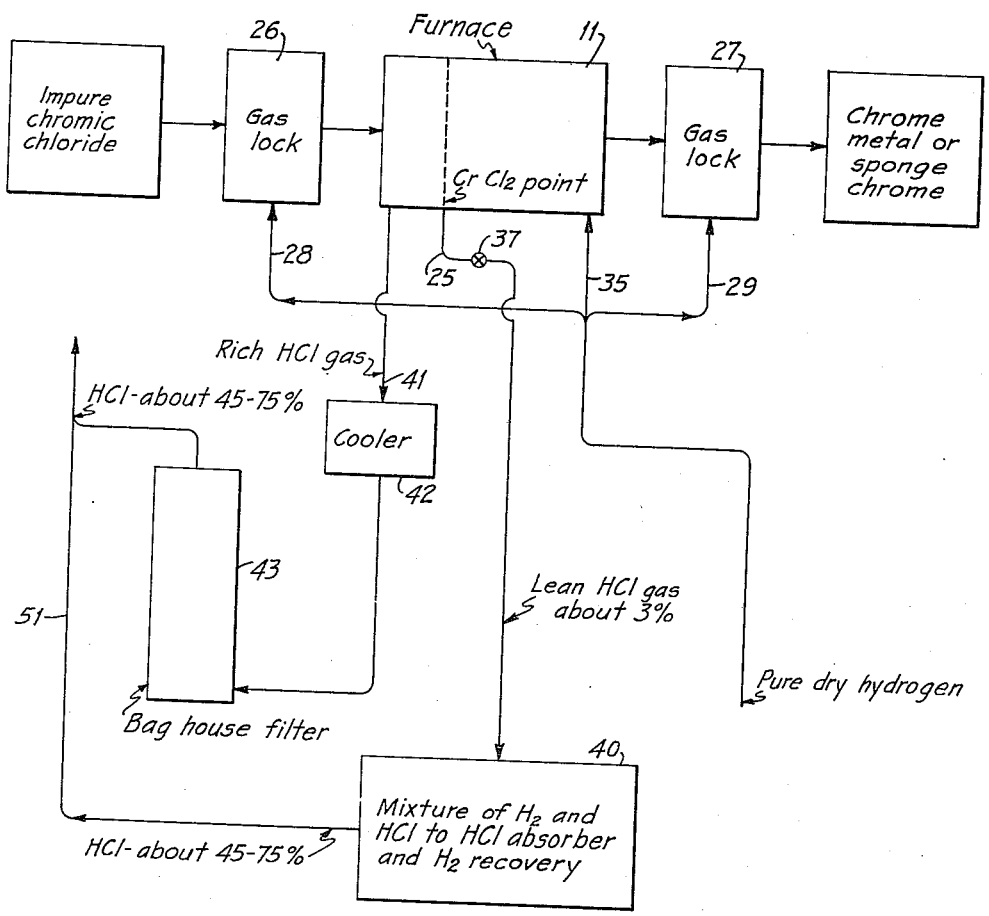
INVENTOR.
Charles G. Maier
BY
Robert H. Eckhoff
ATTORNEY Patented Feb. 15, 1944

2,341,844

UNITED STATES PATENT OFFICE 2,341,844

PROCESS FOR TREATING AND REDUCING CHROMIUM CHLORIDE

Charles G. Maier, Oakland, Calif., assignor to The Dow Chemical Company, Midland, Mich., a corporation of Michigan Original application April 27, 1940, Serial No. 332,421. Divided and this application June 24, 1942, Serial No. 448,227

9 Claims. (Cl. 75—84)

This application is a division of my application Serial Number 332,421 filed April 27, 1940, now Patent No. 2,304,463 of December 8, 1942.

The present invention relates to an improved process for reducing violet chromic chloride by hydrogen to chrome metal at elevated temperatures generally according to the disclosure of my Patent 2,142,694 issued January 3, 1939.

In reducing violet chromic chloride with hydrogen to produce chrome metal it has heretofore been considered essential that the chloride introduced be as free of moisture as was possible. Any moisture present in the chloride introduced into the reduction process results in production of an equivalent quantity of chromium oxide. In said patent I suggested that the violet chromic chloride be dried by heating in a vacuum to a temperature between 200° and 300° C. In practice, drying in this manner proved to be troublesome; it is not a simple operation. Further, the hygroscopic nature of the violet chromic chloride varies from sample to sample. In addition, the dried product is hygroscopic, and it is necessary to store it in a moisture-free environment.

Ordinary methods of drying the violet form of $CrCl_3$ fail to render satisfactorily the material permanently non-hygroscopic and, in fact, even enhance hygroscopicity if exact control is not maintained. Thus, drying in a vacuum or inert gas tends to dissociate $CrCl_3$ forming more $CrCl_2$, and making the product even more hygroscopic, particularly when temperatures above about 300° C. are used. The actual drying below this temperature, as specified in my patent, is slow, tedious, and if too many impurities are present, ineffective. Similarly, oxygen-containing gases cannot be used and if only chlorine is added to an inert gas for drying, or to prevent dissociation and chromous chloride formation, the volatility as chromium tetrachloride is enhanced.

I have determined that among the impurities responsible for solubility and hydroscopic character of violet $CrCl_3$ produced from chrome ores, two classes are distinguishable. The first is provided by chromous chloride, and the second by the chlorides of aluminum, magnesium, iron, and, sometimes, manganese and nickel, present in very small quantities as contaminants. Silicon chlorides, which might be expected, have not been disclosed by careful search. These materials are set forth in the order of decreasing effect, the chromous chloride being most potent. It is distinguished from the other metal chlorides by separate classification because its action is partly chemical and because there is a considerable mutual solubility of anhydrous chromous and chromic chlorides in the liquid state, which is not true of the other chlorides mentioned.

The discovery of the present invention, which has enabled the aforementioned disadvantages to be overcome, can be briefly set forth as comprising the finding that when hygroscopic moisture containing violet chromic chloride, contaminated with various other metal chlorides, is heated to a temperature of from 300° C. to a limiting upper temperature below that at which volatilization of chromic chloride is objectionably appreciable (usually about 700° C.) in a dry, non-oxidizing atmosphere containing sufficient pure, dry hydrogen chloride, moisture and metal chlorides present as contaminants can be separated from the solid chromic chloride. By operating at 600° C. the iron content can be reduced to a few tenths of a per cent. By operating at 700° C. it can be rendered negligibly small. The limiting upper temperature is that at which chromic chloride volatilization becomes objectionably appreciable.

This purification and dehydration operation is advantageously combined with a reduction of violet chromic chloride to chromium by heating $CrCl_3$ to a suitable temperature and passing it countercurrent to a stream of pure dry hydrogen. Such a reduction operation is disclosed in my aforementioned patent. That operation, however, has to be modified, in accordance with this invention, as the following will show. In the reduction operation of my patent, the hydrogen introduced is free of HCl; when removed it contains an amount of hydrogen chloride determined by the temperature, the rate of chromium trichloride introduction and the hydrogen circulation rate.

In the operation disclosed in the patent, the temperature is usually maintained at a constant value and chromic chloride to be reduced is introduced at a uniform rate. The hydrogen circulation rate is then adjusted to give the desired hydrogen chloride gas content in the exit gas; at 800° C. and atmospheric pressure this is 4.7% hydrogen chloride. (All gas compositions are by volume.) This content of hydrogen chloride (4.7%) is not sufficient to carry on the desired purification of the violet $CrCl_3$. In accordance with the process of this invention, I so modify the reduction operation as to provide a gas stream containing an increased volume of hydrogen chloride sufficient to ensure moisture removal from and purification of the violet chromic chloride introduced for reduction. This is achieved by taking off some hydrogen and hydrogen chloride at an intermediate point in the furnace and the rest at a point adjacent to the chromic chloride inlet. This enables the hydrogen chloride content of the gas between the two points to be increased to any desired value, usually 25% HCl by volume and up to 100%.

The process of the present invention will be made further apparent upon considering the following disclosure of a present preferred practice. The single figure in the drawing is a diagrammatic showing of an apparatus assembly for practicing the invention.

Into heated furnace 11 a stream of violet chromic chloride is fed through a suitable hydrogen fed gas lock 26. Metallic chromium is removed through another hydrogen fed gas lock 27. The locks are fed with hydrogen through lines 28 and 29 from hydrogen supply line 35. In the furnace, the chromic chloride is moved counter current to a stream of hydrogen introduced from line 35.

In the furnace there is a stage where virtually all of the $CrCl_3$ has been reduced to $CrCl_2$, but where normally little, if any, metallic chromium has been produced. The gas composition at this point in normal operation should be at, or just below, 3.12% hydrogen chloride with the remainder hydrogen. In the region in the furnace whereat this condition exists, I provide a gas bleed line 25. An adjusted and controlled portion, but not all of the gas stream, is bled off through line 25 under control of a valve 37. This withdrawn stream is led through line 25 to the hydrogen purification unit generally indicated at 40. Pure dry hydrogen is supplied from this unit, together with fresh, make up hydrogen, through line 35. An exit gas containing from 45–75% HCl is withdrawn through line 51.

The furnace gas stream remaining after withdrawal of some gas through line 25 pursues its course through the furnace counter current to the impure, moisture containing incoming chromium chloride feed stream. Depending on the quantity of gas withdrawn through line 25, the hydrogen chloride content of the gas stream, passing out of furnace through line 41, can reach a maximum of 100% in some instances. For the purpose of removing all moisture present and substantially all metallic chlorides present, the maximum content of hydrogen chloride is desired in that portion of the furnace ahead of the $CrCl_2$ point; as little as 25% will suffice but preferably 45% and more is provided. This content depends in part upon the material of construction of the reduction furnace. This will be presently discussed. The high hydrogen chloride content of the gas withdrawn from the furnace through line 41 is secured by maintaining the chromic chloride feed rate and the temperature constant and then adjusting the relative volumes withdrawn through lines 25 and 41 to the hydrogen introduced through line 35.

The gas stream issuing from the furnace through line 41 is cooled to condense moisture and sublimed contaminating metallic chlorides in cooler 42. The stream, containing at least 25% hydrogen chloride, is then passed through a bag filter 43 of asbestos fabric and thence to suitable recovery means or disposal means for the hydrogen chloride. This can conveniently be discharge line 51 where it will be combined with a gas mixture of approximately similar composition from the active carbon purification cycle indicated here at 40. This cycle is more fully disclosed in my aforementioned Patent 2,142,694.

When the reduction furnace is made of mild steel, as is disclosed in my Patent 2,142,694, the hydrogen chloride content can usually range between 25% to 45% without too severe corrosion. This can be increased to 55% to 75% when nickel is used. Best of all metallic materials that are commercially usable is nickel with a thin coating of sheet silver. Such a furnace construction permits the hydrogen chloride content to be built up to about 95%. Refractory linings permit a close approximation to 100%, but involve mechanical difficulties of construction and maintenance.

To summarize, in practicing my invention to produce chromium, I treat the chromium trichloride, in the form of violet crystals, directly with an enriched hydrogen chloride gas during the reduction process in that portion of the furnace between the chromium chloride feed and the region whereat the chromium chloride has been substantially entirely reduced to only the divalent state. The hydrogen chloride content of the hydrogen in this portion of the furnace is built up sufficiently to effect the desired purification directly in the reduction process by control of the relative amounts of gas withdrawn in the region of the chromous chloride point and the chromic chloride inlet and the amount of hydrogen introduced. I have found that a hydrogen chloride content of about 45% is satisfactory. While lesser amounts can be employed, the chromium trichloride fed to the furnace must be passed through the furnace more slowly under these circumstances: this may make it desirable to lengthen the furnace. An enhanced hydrogen chloride content, above 45%, permits rapid and more effective action.

Operation of the process of the present invention to produce chromium possesses a further advantage in that the load on the hydrogen purification system 40 is lightened because the hygroscopic moisture in the material originally is driven off without converting the chromic chloride to oxide and is bypassed from the main purification cycle. Further, virtually all the metal chloride contaminating impurities are set free and sublimed without reduction. Thus substantially all of the chlorides of iron, magnesium and manganese existing as impurities in the $CrCl_3$ are sublimed and caught in the exit bag house. A large portion of the aluminum chloride is also sublimed, but a very small residue of $Al_2O_3$ may be left in the sponge chromium since it is not possible to dry moist $Al_2Cl_7$ containing materials without hydrolysis, even in pure hydrogen chloride. Nickel chlorides are not removed, but the presence of minute quantities of nickel as a metal in the sponge chromium product is not disadvantageous.

In practicing the reduction of chromium chloride to chrome metal or sponge chromium, I can employ a less carefully purified $CrCl_3$ as the raw material, and end with a product of higher purity than by the simple drying process of my aforementioned patent, and at the same time divert a part comprising substantially one-third of the hydrogen chloride in the purification cycle, thus enabling a portion of the reduction plant to be decreased in size.

I claim:
1. In a continuous flow process for the production of chromium under substantially steady state conditions by the reduction of violet chromic chloride containing volatilizable metallic chloride impurities by means of hydrogen, in which a stream of hydrogen flows at a substantially constant rate countercurrent to a stream of the chromic chloride in a heated reduction zone, whereby the stream of hydrogen acquires a progressively increasing content of hydrogen chloride, the steps which consist in continuously withdrawing a portion of the hydrogen gas stream at an intermediate point in the reduction zone whereat the chromic chloride has been substantially all reduced only to chromous chloride, and continuously withdrawing the remainder of the gas at the point whereat chromic chloride is introduced into the reduction zone, while maintaining the temperature of the chromic chloride from 300° to 600° C. between the said two points of withdrawal of the gas, the rate of gas withdrawal from said intermediate point being sufficient to maintain at least 25% HCl in the gas withdrawn at the point of introduction of chromic chloride.

2. In a continuous flow process for reduction of a stream of violet chromic chloride to chromium with a stream of hydrogen in a furnace wherein the hydrogen flows counter current to the chromic chloride stream and the hydrogen contains increasing quantities of hydrogen chloride, said chromium chloride being contaminated with other metal chlorides, the steps of withdrawing a portion of the gas phase with an hydrogen chloride content of about 3.2% at a first withdrawal point corresponding substantially to that point in said chromic chloride stream whereat substantially all chromic chloride is reduced only to chromous chloride, and withdrawing remaining gas with an hydrogen chloride content in excess of 25% at a second withdrawal point corresponding substantially to the region of introduction of chromic chloride, while maintaining the chromic chloride stream at a temperature of from 300° C. to 600° C. between said first and second points of withdrawal.

3. In a continuous flow process for reduction of a stream of violet chromic chloride to chromium with a stream of hydrogen in a furnace wherein the hydrogen flows counter current to the chromic chloride stream and the hydrogen contains increasing quantities of hydrogen chloride, said chromium chloride being contaminated with other metal chlorides, the steps of withdrawing a portion of the gas phase with an hydrogen chloride content corresponding substantially to chemical equilibrium in the reduction of chromous chloride to chromium metal at a first withdrawal point corresponding substantially to that point in said chromic chloride stream whereat substantially all chromic chloride is reduced only to chromous chloride, and withdrawing remaining gas with an hydrogen chloride content in excess of 25% at a second withdrawal point corresponding substantially to the region of introduction of chromic chloride, while maintaining the chromic chloride stream at a temperature of from 300° C. to 600° C. between said first and said second points of withdrawal.

4. In a continuous flow process for reduction of a stream of violet chromic chloride to chromium with a stream of hydrogen in a furnace wherein the hydrogen flows counter current to the chromic chloride stream and the hydrogen contains increasing quantities of hydrogen chloride, said chromium chloride being contaminated with other metal chlorides, the steps of withdrawing a portion of the gas phase with an hydrogen chloride content corresponding substantially to chemical equilibrium in the reduction of chromous chloride to chromium metal at a first withdrawal point corresponding substantially to that point in said chromic chloride stream whereat substantially all chromic chloride is reduced only to chromous chloride, and withdrawing remaining gas with an hydrogen chloride content of about 45% to 75% at a second withdrawal point corresponding substantially to the region of introduction of chromic chloride, while maintaining the chromic chloride stream at a temperature of from 300° C. to 600° C. between said first and said second points of withdrawal.

5. In a continuous flow process for reduction of violet chromic chloride contaminated with at least one other metal chloride by counter current contact with a stream of initially dry hydrogen at a temperature whereat substantial volatilization of the chromic chloride is absent, the step of maintaining an hydrogen chloride content in excess of 25 in the stream of hydrogen passed over the chromic chloride in that region wherein substantially all chromium present undergoes reduction from the chromic to the chromous state to sweep off and remove said other metal chloride volatilized in said region.

6. In a continuous flow process for reduction of violet chromic chloride contaminated with at least one other metal chloride by counter current contact with a stream of initially dry hydrogen at a temperature whereat substantial volatilization of the chromic chloride is absent, the step of maintaining a temperature of about 600° C. and an hydrogen chloride content in excess of 25% in the stream of hydrogen passed over the chromic chloride in that region wherein substantially all chromium present undergoes reduction from the chromic to the chromous state to sweep off and remove said other metal chloride volatilized in said region.

7. In a continuous flow process for reduction of violet chromic chloride contaminated with at least one other metal chloride to chromium by counter current contact with a stream of initially dry hydrogen at a temperature whereat substantial volatilization of the chromic chloride is absent, maintaining a temperature of about 600° C. and an hydrogen chloride content in excess of 25% in that region wherein substantially all chromium present undergoes reduction from the chromic to the chromous state and maintaining a maximum hydrogen chloride content corresponding to chemical equilibrium in the reduction of chromous chloride to chromium metal in that region wherein the chromous chloride undergoes reduction to the metallic state.

8. In a continuous flow process for reduction of violet chromic chloride contaminated with at least one other metal chloride to chromium by counter current contact with a stream of initially dry hydrogen at a temperature whereat substantial volatilization of the chromic chloride is absent, reducing sufficient chloride with hydrogen to maintain a hydrogen chloride content in excess of 25% in that region wherein substantially all chromium present undergoes reduction from the chromic to the chromous state and reducing remaining chloride with hydrogen to provide a maximum hydrogen chloride content corresponding to chemical equilibrium of chromous chloride with chromium metal in that region whereat only chromous chloride is present as the only chromium chloride.

9. In a continuous flow process for the production of chromium under substantially steady state conditions by the reduction of violet chromic chloride containing volatilizable metallic chloride impurities by means of hydrogen, in which a stream of hydrogen flows at a substantially constant rate counter current to a stream of the chromic chloride in a heated reduction zone, whereby the stream of hydrogen acquires a progressively increasing content of hydrogen chloride, the steps which consist in continuously withdrawing a portion of the hydrogen gas stream at an intermediate point in the reduction zone whereat the chromic chloride has been substantially all reduced only to chromous chloride, and continuously withdrawing the remainder of the gas at the point whereat chromic chloride is introduced into the reduction zone, while maintaining the temperature of the chromic chloride sufficiently high to sublime metallic chloride impurities present without substantially subliming chromium chloride, the rate of gas withdrawal from said intermediate point being sufficient to maintain at least 25% HCl in the gas withdrawn at the point of introduction of chromic chloride.

CHARLES G. MAIER.